United States Patent
Zohar et al.

(10) Patent No.: US 8,386,744 B2
(45) Date of Patent: Feb. 26, 2013

(54) THIN PROVISIONING MIGRATION AND SCRUBBING

(75) Inventors: Ofir Zohar, Alfe-Menashe (IL); Shemer Schwartz, Herzelia (IL); Haim Helman, Ramat Gan (IL); Ehood Garmiza, Givat Smoel (IL); Omri Palmon, Tel-Aviv (IL); Efri Zeidner, Haifa (IL)

(73) Assignee: International Business Machines Corporation, Armonk, NY (US)

(*) Notice: Subject to any disclaimer, the term of this patent is extended or adjusted under 35 U.S.C. 154(b) by 614 days.

(21) Appl. No.: 12/019,650

(22) Filed: Jan. 25, 2008

(65) Prior Publication Data

US 2009/0089534 A1    Apr. 2, 2009

Related U.S. Application Data

(60) Provisional application No. 60/976,572, filed on Oct. 1, 2007.

(51) Int. Cl.
  *G06F 12/00*    (2006.01)
(52) U.S. Cl. ............... 711/202; 711/205; 711/206
(58) Field of Classification Search .......... 711/202, 711/205, 206
  See application file for complete search history.

(56) References Cited

U.S. PATENT DOCUMENTS

| | | | |
|---|---|---|---|
| 5,649,158 A | 7/1997 | Lahr et al. | |
| 5,829,045 A | 10/1998 | Motoyama | |
| 7,024,526 B2 | 4/2006 | Watanabe | |
| 7,130,960 B1* | 10/2006 | Kano | 711/112 |
| 7,162,600 B2 | 1/2007 | Kano et al. | |
| 7,225,314 B1* | 5/2007 | Bonwick et al. | 711/170 |
| 7,594,137 B2 | 9/2009 | Kawaguchi et al. | |
| 8,180,989 B2 | 5/2012 | Seki et al. | |
| 2004/0080558 A1* | 4/2004 | Blumenau et al. | 347/19 |
| 2006/0200481 A1* | 9/2006 | Goyan | 707/101 |
| 2006/0224844 A1 | 10/2006 | Kano et al. | |
| 2007/0150690 A1 | 6/2007 | Chen et al. | |
| 2007/0174549 A1 | 7/2007 | Gyl et al. | |
| 2008/0288436 A1* | 11/2008 | Priya N V | 706/48 |

FOREIGN PATENT DOCUMENTS

| | | |
|---|---|---|
| JP | 6168171 A | 6/1994 |
| JP | 6202921 A | 7/1994 |
| JP | 8123735 A | 5/1996 |
| JP | 8278908 A | 10/1996 |
| JP | 2004280779 A | 10/2004 |
| JP | 2006277723 A | 10/2006 |
| JP | 2006302258 A | 11/2006 |
| JP | 2007199922 A | 8/2007 |
| JP | 2008146574 A | 6/2008 |
| JP | 2008171311 A | 7/2008 |
| JP | 2009524867 A | 7/2009 |

OTHER PUBLICATIONS

International Search Report for counterpart Application No. PCT/IL2008/01305, dated Mar. 13, 2009.

* cited by examiner

*Primary Examiner* — Jared Rutz
*Assistant Examiner* — Gurtej Bansal
(74) *Attorney, Agent, or Firm* — Griffiths & Seaton PLLC (57) ABSTRACT

A method for migrating data to a mass storage system, including receiving an incoming data partition for storage in the mass storage system and allocating logical storage for the incoming data partition in the mass storage system. The method further includes making a determination that the incoming data partition includes only zero data, and, in response to the determination, inhibiting physical storage of the incoming data partition in the mass storage system while maintaining the allocated logical storage for the incoming data partition.

21 Claims, 5 Drawing Sheets

THIN PROVISIONING MIGRATION AND SCRUBBING

CROSS-REFERENCE TO RELATED APPLICATION

This application claims the benefit of U.S. Provisional Application No. 60/976,572 filed Oct. 1, 2007, which is hereby incorporated by reference in its entirety.

FIELD OF THE INVENTION

The present invention relates generally to methods and apparatus for data storage, and specifically to methods and apparatus for managing multiple logical volumes in data storage systems.

BACKGROUND OF THE INVENTION

In organizations that provide their users with numerous applications, large-scale computer disk storage systems are often used. Storage virtualization is also utilized to abstract logical storage from physical storage. A virtualization system provides a logical space for data storage while managing some form of mapping between the logical and actual physical storage location. A thin provisioning system provides storage space to application servers on an as-needed basis. Thin provisioning also simplifies capacity planning because it automatically aggregates the needs of all the servers sharing the storage system into a single growth rate.

SUMMARY OF THE INVENTION

In an embodiment of the present invention a method is provided for migrating data to a mass storage system. The method includes receiving an incoming data partition for storage in the mass storage system. Logical storage is allocated for the incoming data partition in the mass storage system. The contents of the data partition are checked, and if the incoming data partition includes only zero data, physical storage of the incoming data partition in the mass storage system is inhibited, while the allocated logical storage for the incoming data partition is maintained. Inhibiting the physical storage and maintaining the logical storage provides significant savings in storage space, with no reduction in the level of information stored.

In some embodiments, allocating logical storage includes creating a partition data record having a logical address for the incoming data partition, and storing the partition data record in a permanent medium. When the incoming data partition is determined to contain non-zero data, the incoming data partition is stored in the permanent medium, and the partition data record typically contains a physical address of the incoming data partition.

Typically, the mass storage system is a thin provisioning storage system.

In disclosed embodiments, a request to the storage system to provide a data partition including only zero data is responded to with a data partition including zero bits.

In an alternative embodiment of the present invention a method is provided for monitoring data in a mass storage system. The method includes reading a data partition from physical storage, and determining if the data partition includes only zero data. In response to a determination that the partition does only include zero data, physical storage of the data partition is de-allocated in the mass storage system while logical storage for the data partition is maintained.

In some disclosed embodiments, reading the data partition includes checking the data partition for at least one of integrity and correctness, and in response to the checking, correcting the data partition.

In some embodiments, de-allocating the physical storage includes removing the physical address from a partition descriptor record associated with the data partition.

There is therefore provided, according to an embodiment of the present invention a method for migrating data to a mass storage system, including:

receiving an incoming data partition for storage in the mass storage system;

allocating logical storage for the incoming data partition in the mass storage system;

making a determination that the incoming data partition includes only zero data; and in response to the determination, inhibiting physical storage of the incoming data partition in the mass storage system while maintaining the allocated logical storage for the incoming data partition.

Typically, allocating the logical storage includes creating a partition data record including at least a logical address for the incoming data partition. Creating the partition data record may include storing the partition data record in a permanent medium.

In one embodiment the method includes making a further determination that the incoming data partition includes non-zero data, and, in response to the further determination storing the incoming data partition in a permanent medium. Storing the incoming data partition in a permanent medium may include updating a partition data record to contain a physical address for the incoming data partition.

In a disclosed embodiment the mass storage system includes a thin provisioning storage system.

In an alternative embodiment the method includes responding to a request to the mass storage system to provide a data partition having only zero data with a data partition of zero bits.

There is further provided, according to an embodiment of the present invention, a method for monitoring data in a mass storage system, including:

reading a data partition from physical storage;

making a determination that the data partition includes only zero data; and in response to the determination, de-allocating physical storage of the data partition in the mass storage system while maintaining an allocation of logical storage for the data partition.

Typically, reading the data partition includes checking the data partition for at least one of integrity and correctness. The method may also include correcting the data partition in response to the checking.

In one embodiment reading the data partition includes making a determination that the data partition erroneously includes non-zero data.

In an alternative embodiment, maintaining the allocation of logical storage includes creating a partition data record having at least a logical address for the data partition. The method typically includes storing the partition in a permanent medium, and storing the partition in a permanent medium may include updating the partition data record to contain a physical address for the incoming data partition, and de-allocating the physical storage may include removing a physical address from the partition descriptor record.

In a further alternative embodiment, the method includes responding to a request to the mass storage system to provide the data partition with an outgoing data partition of zero bits.

There is further provided, according to an embodiment of the present invention, apparatus for migrating data to a mass storage system, including:

a control unit, which is configured to:

receive an incoming data partition for storage in the mass storage system, and allocate logical storage for the incoming data partition in the mass storage system; and a processor which is coupled to the control unit so as to:

make a determination that the incoming data partition includes only zero data, and in response to the determination, inhibit physical storage of the incoming data partition in the mass storage system while maintaining the allocated logical storage for the incoming data partition.

There is further provided, according to an embodiment of the present invention, apparatus for monitoring data in a mass storage system, including:

a control unit which is configured to read a data partition from physical storage; and a processor which is coupled to the control unit so as to:

perform a determination that the data partition includes only zero data, and in response to the determination, de-allocate physical storage of the data partition in the mass storage system and maintain allocated logical storage for the data partition.

The present invention will be more fully understood from the following detailed description of the embodiments thereof, taken together with the drawings in which:

DETAILED DESCRIPTION OF EMBODIMENTS

Overview

Thin provisioning is "just in time capacity" that essentially eliminates allocated but unused storage or stranded storage. One way to implement a mechanism of thin provisioning in a storage system is described in United States Patent Application Publication No. 2006/0253681, titled "Dynamic allocation of storage for hierarchical copies", which disclosure is incorporated herein by reference.

Embodiments of the present invention provide methods for enhancing the performance of a thin provisioning storage system. When the contents of a physical data partition have the value zero, whereby all of the data bits are "off," the partition needs to be defined logically but does not require physical storage space. This situation may arise in various ways, for example when an application operates upon data contained in a partition and yields a result equal to zero.

One embodiment of the present invention described below may be used when data is migrated from a source storage system to a destination thin provisioning storage system. Each data partition that is migrated is analyzed before being allocated physical storage. If the contents of the partition have the value zero, logical storage is allocated and no physical storage is utilized. When an application requests to read all or part of this partition, the request is duly responded to by returning a partition composed of only zeroes. Inhibiting physical storage of migrated "zero" partitions improves storage efficiency while increasing the available storage space for application data.

Another embodiment of the present invention eliminates physical storage of partitions with zero valued contents during operation of a "scrubbing" procedure. Typically, storage systems include a scrubbing procedure that works in the background of regular system activity to periodically check each partition stored on the disks for data integrity and correctness. Scrubbing procedures are typically applied to restore correct data to partitions that are found to be defective, by scrubbing the data clean. A scrubbing procedure may be implemented to check for the possibility that the data stored in a partition is only zeroes in addition to performing the integrity and correctness check. If a partition contains only zeroes, then the partition remains defined in the system logically, but the physical storage space on the disks is de-allocated and the contents of the partition (only zeroes) are not written out to the disk. When an application requests to read all or part of this partition, the request is duly responded to by returning a partition composed of only zeroes. Elimination of physical storage for "zero" partitions when they are found during scrubbing provides advantages similar to those described above for data migration.

System Description

Figure 1:
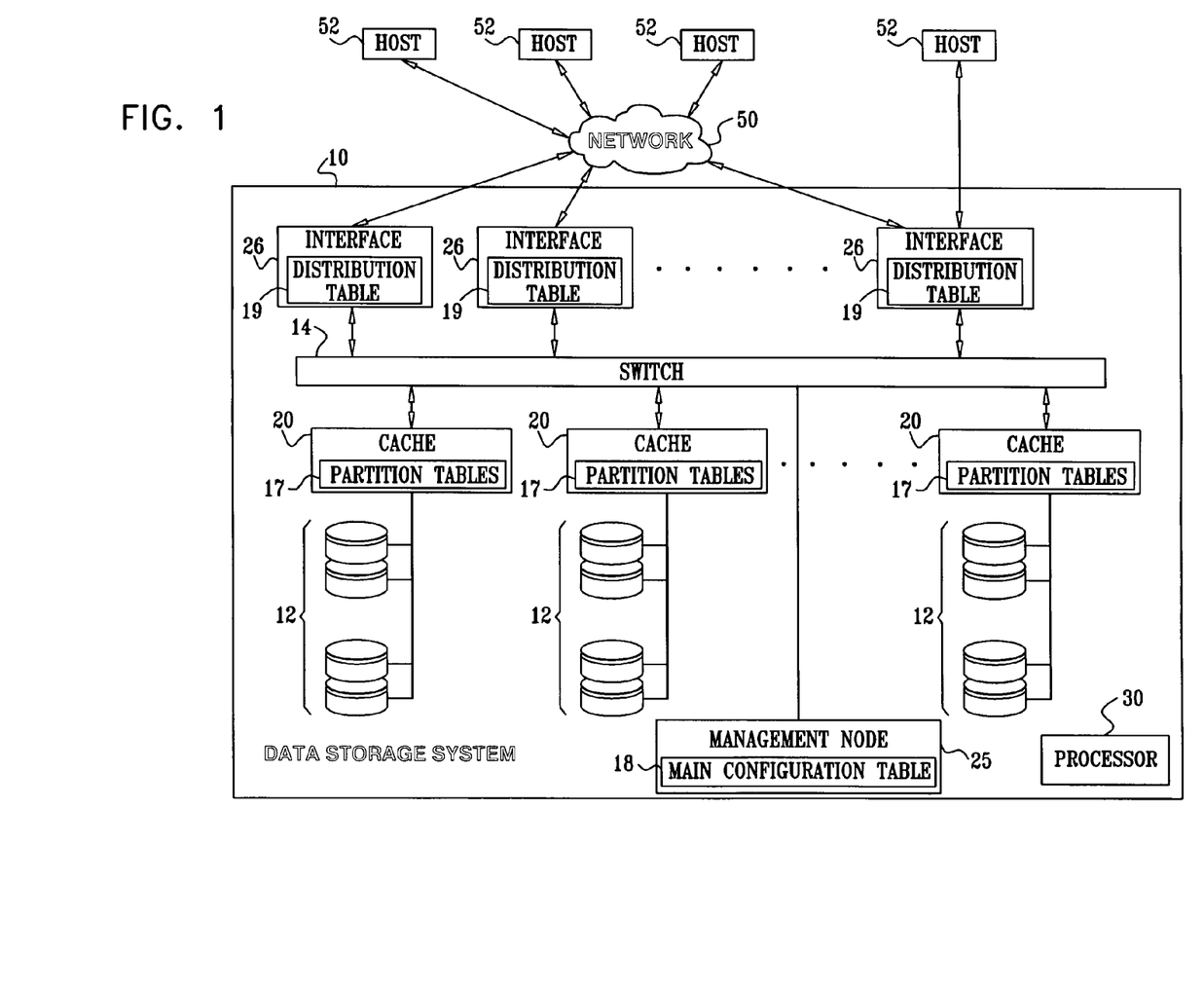
FIG. 1 is a schematic diagram of a data storage system, in accordance with an embodiment of the present invention.

FIG. 1 shows a schematic block diagram of a mass data storage system 10, in accordance with an embodiment of the present invention. System 10 is connected to one or more hosts 52 by any means known in the art, for example, via a network 50 such as the Internet or by a bus. Data is stored within system 10 in logical units (LUNs), comprising sequences of logical blocks associated with logical addresses (LAs). The contents of these blocks are typically stored in a distributed way across a group of slow and/or fast access time, non-volatile mass storage devices 12, assumed herein to be disks by way of example. Hosts 52 access the data stored in disks 12 via input/output (I/O) requests, which comprise I/O read requests and I/O write requests. In an I/O read request the requested data is read from one of disks 12 wherein the data is stored. In an I/O write request the data is written to one or more disks 12.

System 10 may comprise a management node 25, typically implemented as one or more processing units, which may incorporate disks 12, and/or other elements of system 10, by methods which will be familiar to those skilled in the art. System 10 may also comprise one or more substantially similar interfaces 26 which receive I/O read and write requests from hosts 52, requiring access to disks 12. Each interface 26 may be implemented in hardware and/or software, and may be located in storage system 10 or alternatively in any other suitable location, such as an element of network 50 or one of hosts 52. Between disks 12 and the interfaces are a multiplicity of interim caches 20, each cache being coupled to a respective sub-group of disks 12. Caches 20 are coupled to interfaces 26 by any suitable fast coupling system known in the art, such as a bus or a switch, so that each interface is able to communicate with, and transfer data to and from, each cache, which is in turn able to transfer data to and from its sub-group of disks 12 as necessary. By way of example, the coupling between caches 20 and interfaces 26 is herein assumed to be by a first cross-point switch 14. Interfaces 26 operate substantially independently of each other. Caches 20 and interfaces 26 operate as a data transfer system, transferring data between hosts 52 and disks 12.

A processor 30, which may comprise one or more processing units, typically distributed in storage system 10, operates the system. The processor typically sends instructions to management node 25 and caches 20.

Consecutive blocks of each logical unit (LUN) in system 10 are grouped into partitions, whose lengths are typically identical throughout the system. Thus the LUN comprises consecutive strings of logical partitions which in turn comprise consecutive strings of logical blocks. In the embodiments of the invention described here, partitions are assumed to be the basic data portions used to manage most data transactions described herein, including scrubbing processes. However, any other convenient system for apportioning the data in data transactions may be used.

The management node assigns logical unit partitions to each cache 20, so that each cache is able to retrieve data from, and/or store data at, the range of LAs of its assigned partitions. The ranges are typically chosen so that the complete memory address space of disks 12 is utilized. In system 10 data may be redundantly stored, in which case each partition is mapped to at least two caches, and to the disks 12 respectively associated with them. A method for redundantly mapping logical address ranges to caches is described in United States Patent Application Publication No. 2005/0015566, titled "Data Allocation in a Distributed Storage System," which is assigned to the assignees of the present invention. Such a method may be used in embodiments of the present invention.

The assigned partitions for each cache 20 are typically recorded in a distribution table 19 stored in each interface 26. Each distribution table is used by its interface to route I/O requests from hosts 52 to the caches. Alternatively or additionally, the assigned partitions for each cache 20 are stored in each interface 26 by any other suitable method known in the art for generating a correspondence between partitions and caches. It will be understood that distribution table 19 gives each interface 26 a general overview of the complete cache address space of system 10. United States Patent Application Publication No. 2005/0015567, titled "Distributed Independent Cache Memory," which is assigned to the assignees of the present invention, describes a method that may be applied for generating tables such as distribution table 19.

An I/O request to access data is conveyed to a specific cache, and may be serviced by the cache itself, or by disks 12 connected to the cache. Thus, each cache acts on the I/O requests conveyed to it substantially independently of the other caches; similarly, each cache communicates with its respective sub-group of disks substantially independently of communication between other caches and their respective sub-groups. Each cache 20 comprises a respective set of partition tables 17, specific to the cache; the function of the partition tables is described in more detail below.

Management node 25 may also maintain a main configuration table 18 comprising information that is partly contained in partition tables 17 and partly in distribution tables 19. In embodiments of the present invention, processor 30 may produce configuration changes in the system by modifying the main configuration table and broadcasting the relevant, modified information to caches 20 and to interfaces 26, so that they will modify partition tables 17 and distribution tables 19, respectively.

Figure 2:
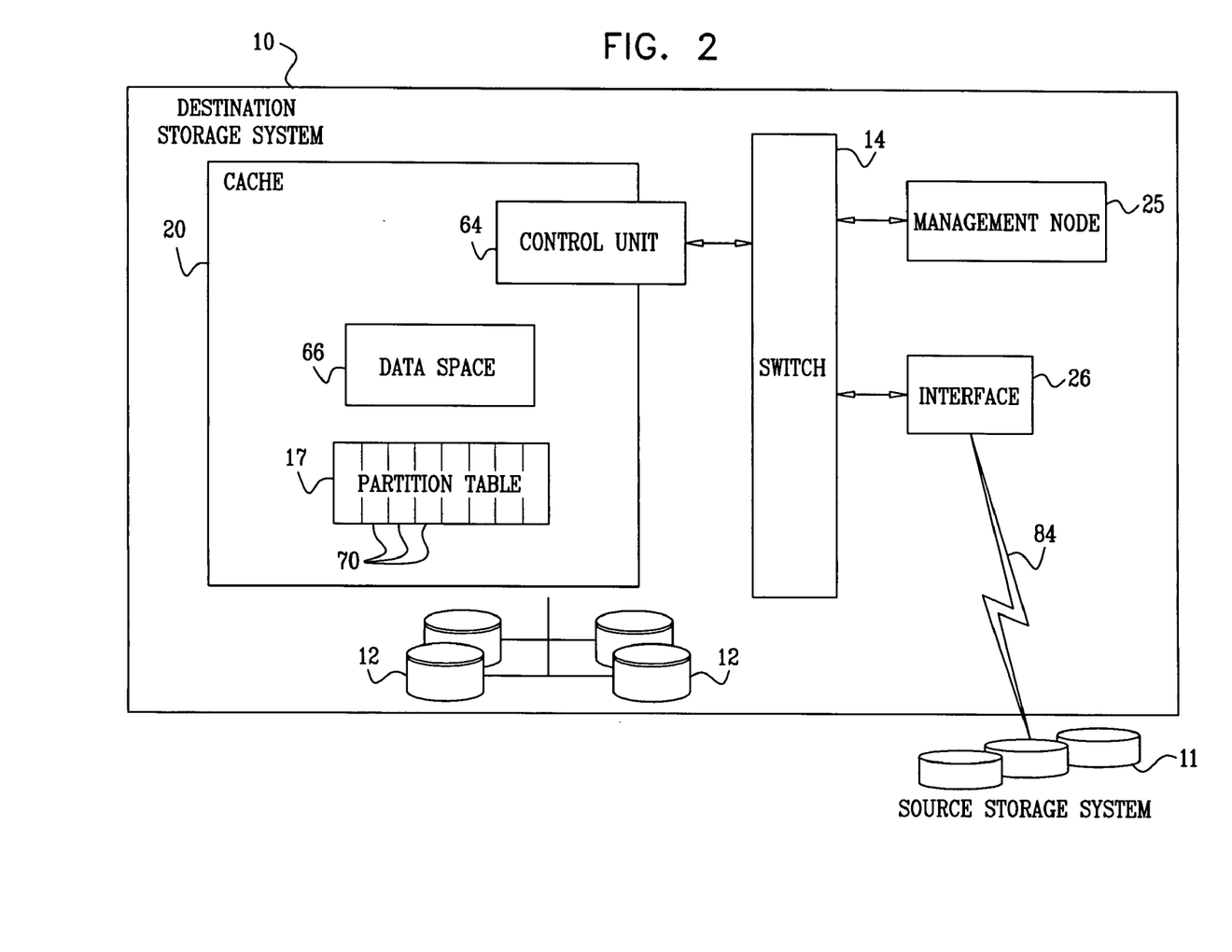
FIG. 2 is a schematic diagram of the data storage system of FIG. 1 connected to another storage system, in accordance with an embodiment of the present invention

FIG. 2 shows a schematic diagram of storage system 10 connected to a source storage system 11, in accordance with an embodiment of the present invention. In system 10 each cache 20 may comprise a control unit 64, a data space 66, and partition descriptor records 70, which are all described in more detail below. For clarity, in FIG. 2 only one interface 26, and one cache 20 and its coupled disks 12, are shown. The cache is shown in more detail than in FIG. 1. The purpose of the connection between the storage systems is to migrate data from the source storage system to storage system 10, herein also termed the destination storage system. Source system 11 comprises substantially any kind of storage system known in the art. Interface 26 is configured to read data formatted as per source system 11 and, if necessary, to rearrange the migrated data into data partitions of the kind that system 10 can store, so that a migration process can be performed.

The connection between the two systems may be implemented via a link 84 which transfers data from some communication port in system 11 to, for example, the one or more interfaces 26 in system 10. From there data will be directed to the corresponding cache 20 as in the case of any kind of I/O write request coming from hosts 52.

When a data partition coming from system 11 reaches the appropriate cache 20 in system 10 it may be further written into disks 12. The cache may contain control unit 64 to manage cache functionality, the unit typically operating under instructions from processor 30. Alternatively, cache behavior may be implemented, under overall control of processor 30, by dedicated hardware logic, or by a combination of hardware and software elements. Hereinbelow it is assumed that cache 20 comprises control unit 64, and that functions performed by control unit 64 and processor 30 may be interchanged.

If sufficient data blocks for storing the data are available on disks 12, control unit 64 stores the data at physical addresses on the disks and creates links between the physical storage addresses and one or more respective logical partitions of the LUN. The links created by the control unit are herein termed partition descriptor records (PDRs) 70, and the PDRs are stored in the partition table 17 of the cache. When the storage system receives an I/O command to access data at a logical partition of the LUN, the control unit uses the PDR to identify the required physical location.

If sufficient data blocks do not exist to store the data, then storage system 10 returns an error message.

According to an embodiment of the present invention, a migrating partition is initially temporarily stored in a data space 66. The control unit then checks the partition to determine if it contains data other than zeroes. This is typically the standard case. However, there may be cases in which the partition is composed of only zeroes, or, in other words, has all of its bits turned off.

If control unit 64 determines that the incoming partition in data space 66 is composed of only zeroes, it considers the partition to be defined in system 10 but it does not allocate physical storage space for it on the disks and it does not write the content of this partition (only zeroes) to the disks. If, later on, a host 52 sends a request to storage system 10 to read all or a part of the migrated partition, the request will be duly responded to by returning to the host a partition composed of only zeroes.

Figure 3:
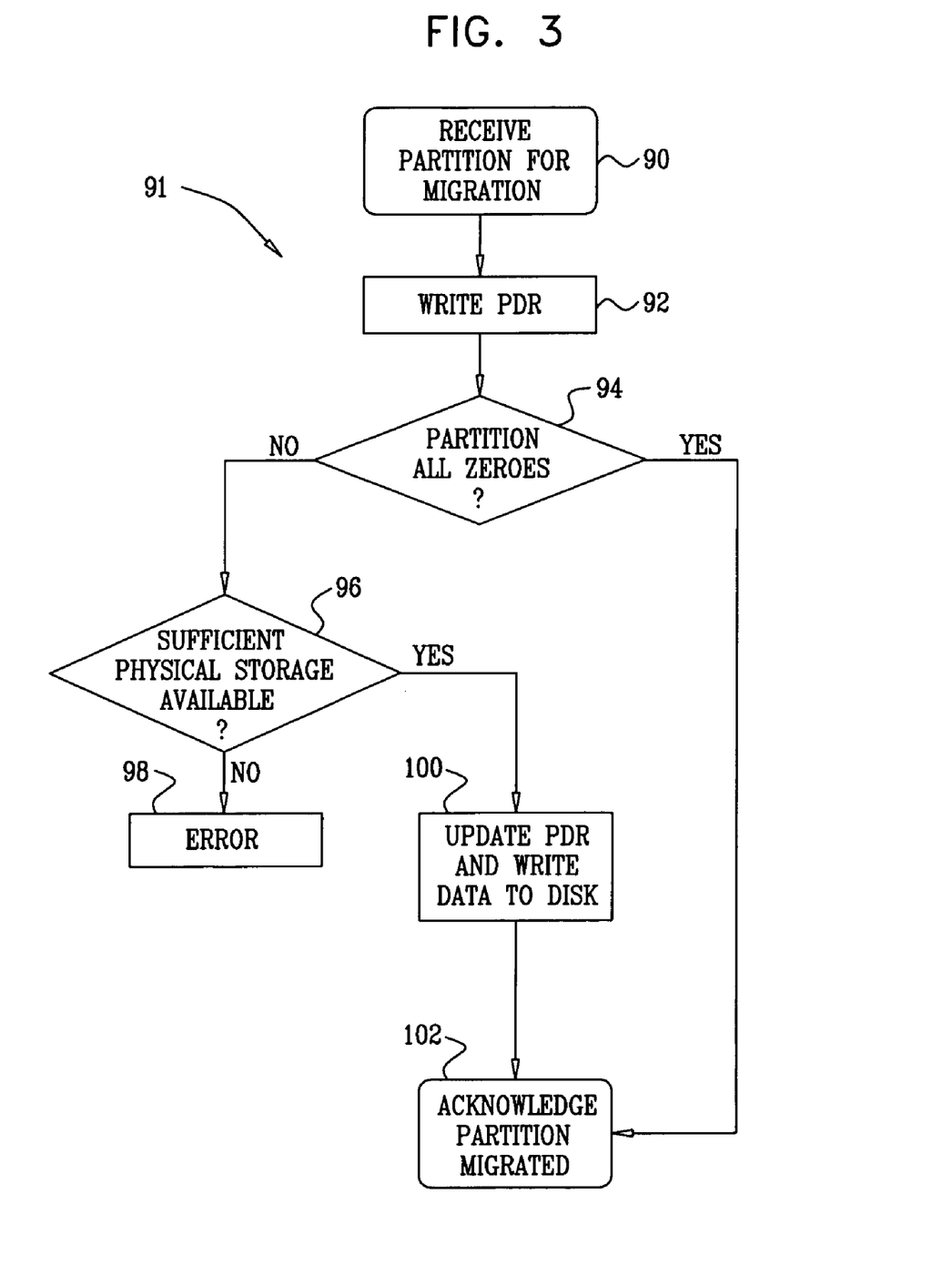
FIG. 3 is a flowchart that schematically illustrates a method for storing a migrated partition in the data storage system of FIG. 1, in accordance with an embodiment of the present invention.

FIG. 3 is a flowchart 91 that schematically illustrates a method for storing a partition being migrated from storage system 11 to storage system 10, in accordance with an embodiment of the present invention. This method may be used by control unit 64 in response to a command to control data migration. Additionally or alternatively, the method may be invoked by management node 25 operated by the processor, when it needs to migrate a partition from a source storage system to storage system 10.

In a reception step 90 cache 20 receives a partition being migrated from storage system 11 and control unit 64 may temporarily store the partition for analysis in data space 66.

In a PDR writing step 92, the control unit creates a specific PDR 70 (FIG. 2) and writes the logical address (LA) of the received partition in the PDR The PDR is stored in partition table 17 to record the receipt of the migrated partition.

In a partition analysis step 94 control unit 64 then analyzes the migrated partition in data space 66 to determine if all of the bits have the value zero. If the control unit determines that the partition is composed of only zeroes, it may inform management node 25 or processor 30 that it has completed the partition migration in an acknowledgement step 102. Additionally, the control unit may update PDR 70 to indicate that no physical space has been allocated.

However, if control unit 64 determines that the migrated partition contains non-zero data, it checks to see if there is sufficient physical storage available for the partition on disks 12 in a sufficient space determination step 96. If there is not enough space available on the disks then an error condition is raised in an error response step 98. If there is enough available space to store the migrated partition on the disks, then the control unit writes the partition data to the disks and updates the migrated partition PDR by recording the physical address of the partition in a physical storage step 100. The control unit then informs management node 25 or processor 30 that it has completed the partition migration in acknowledgement step 102. Implementation of flowchart 91 inhibits physical storage of migrated "zero" partitions, improves storage efficiency, and increases the available storage space for application data.

Figure 4:
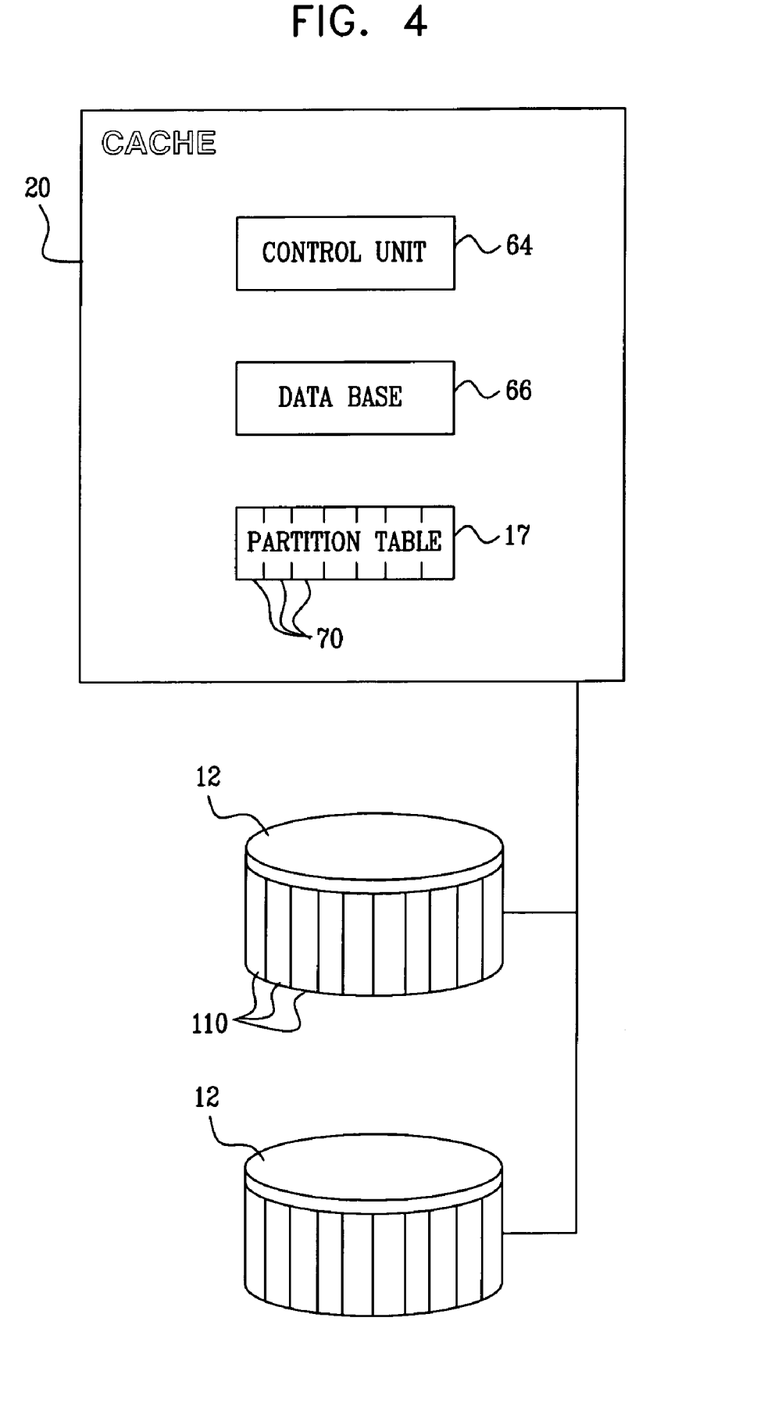
FIG. 4 is a schematic diagram of a cache in the data storage system of FIG. 1, in accordance with an embodiment of the present invention.

FIG. 4 shows a schematic diagram of one cache 20 and its sub-group of disks 12 in storage system 10, in accordance with an embodiment of the present invention. In FIG. 4 elements of cache 20 indicated by the same reference numerals as the elements of cache 20 described above with reference to FIG. 2 are generally similar in construction and in operation. In the following description disks 12 are assumed to comprise physical data partitions 110. Storage system 10 may be configured to implement an enhanced scrubbing procedure on its disks, by incorporating the enhanced thin provisioning system described above. In one embodiment of the invention, the cache, in addition to performing an integrity and correctness check (described above in the overview), also checks for the possibility that the data stored in the partition is only zeroes.

In scrubbing, control unit 64 copies a given physical data partition 110 stored on disks 12 to data space 66. The physical partition is checked for integrity and correctness and the control unit corrects any errors that are found. Then the control unit checks for the possibility that the data stored in the data space contains only zeroes. If this is the case, then the control unit updates PDR 70 in partition table 17 so that the partition retains a logical address while the physical address is de-allocated. If the partition contains non-zero data, the control unit writes the scrubbed partition in data space 66 back to the physical data partition on the disks.

One type of error that may be found in the integrity and correctness check is when the physical data partition erroneously contains non-zero data, but should actually contain only non-zero data. If this is the case, as described above, the control unit updates PDR 70 in partition table 17 so that the partition retains a logical address while the physical address is de-allocated.

Figure 5:
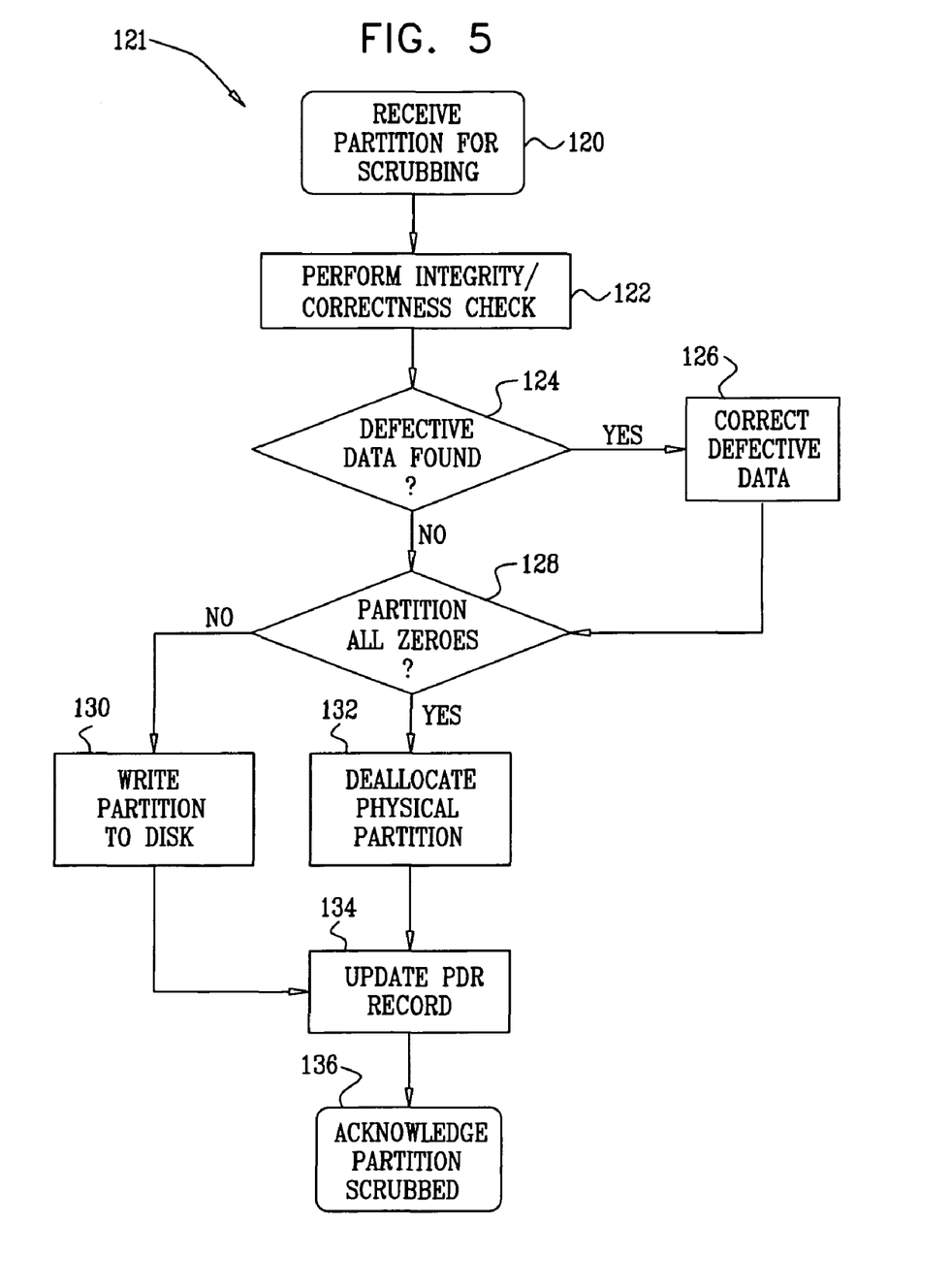
FIG. 5 is a flowchart that schematically illustrates a method for scrubbing a data partition in the data storage system of FIG. 1, in accordance with an embodiment of the present invention.

FIG. 5 is a flowchart 121 that schematically illustrates a method for scrubbing a data partition by the cache of FIG. 4, in accordance with an embodiment of the present invention.

In a partition receipt step 120, control unit 64 receives a partition from disks 12 for scrubbing, and may store it temporarily in data space 66. In an integrity checking step 122, the control unit checks the partition data for integrity and correctness. The integrity check typically comprises checking that the partition data complies with related data, the correctness check typically comprises checking that values of the partition data are valid. In a defective data determination step 124, the control unit determines whether the partition data contains errors. In a data correction step 126, the control unit corrects any defective data that is found. The corrections applied include those described above with reference to FIG. 4.

In a partition analysis step 128, control unit 64 then analyzes the partition in data space 66 to determine if all of the bits have the value zero. In a storage de-allocation step 132, the control unit de-allocates the physical partition if it determines that the partition is composed of only zeroes. This frees the physical disk space on disks 12, previously occupied by the partition, to be used for storage.

Following on from step 132, in a PDR update step 134, the partition data record for the partition is updated to remove the physical address, retaining the logical address (LA). The control unit understands that any PDR 70 that contains a logical address without a corresponding physical address indicates that the partition is composed of only zeroes. This ensures that if, later on, host 52 sends a request to storage system 10 to read all or a part of the partition, the request will be duly responded to by the storage system returning to the host an outgoing partition composed of only zeroes.

Returning to partition analysis step 128, if non-zero partition data is found, control unit 64 writes the partition data from data space 66 to the disks in a partition writing step 130. In a PDR modification step 134, control unit 64 may update the physical address for PDR 70 if the data correction has altered the partition size.

Following step 130 or 134, control unit 64 informs management node 25 or processor 30 that it has completed scrubbing the partition in an acknowledgement step 136. Implementation of flowchart 121 eliminates physical storage of "zero" partitions found during the scrubbing process, which improves storage efficiency, and increases the available storage space for application data.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for migrating data to a mass storage system including a cache memory and a long-term memory, comprising:
   receiving, by a controller, an incoming data partition for storage in the mass storage system;
   allocating, by the controller, logical storage for the incoming data partition in the mass storage system;
   analyzing, by the controller, the incoming data partition, wherein if the incoming data partition includes only zero data:
      logically defining the incoming data partition,
      creating a partition data record (PDR) for the incoming partition, and providing a logical address for the incoming data partition without ever allocating physical storage space in the long-term memory, wherein the PDR is utilized to generate a partition comprising only zeroes when a request to read the incoming partition is received; and transmitting, by the controller, an acknowledgment to a management node in response to determining that the incoming data partition includes only zero data, the acknowledgement indicating that the incoming data partition has been migrated to the mass storage system while no physical space has been allocated.

2. The method according to claim 1, wherein allocating the logical storage comprises creating a partition data record comprising at least a logical address for the incoming data partition.

3. The method according to claim 2, wherein creating the partition data record comprises storing the partition data record in a permanent medium.

4. The method according to claim 1, wherein if the incoming data partition includes non-zero data, the incoming data partition is stored in a permanent medium.

5. The method according to claim 4, further wherein if the incoming data partition includes non-zero data, the partition data record is updated to contain a physical address.

6. The method according to claim 1, wherein the mass storage system comprises a thin provisioning storage system.

7. The method according to 1, and comprising responding to a request to the mass storage system to provide a data partition comprising only zero data with a data partition comprised of zero bits.

8. An apparatus for migrating data to a mass storage system including a cache memory and a long-term memory, comprising:

a control unit, which is configured to:
  receive an incoming data partition for storage in the mass storage system,
  allocate logical storage for the incoming data partition in the mass storage system; and a processor which is coupled to the control unit so as to:
  analyze the incoming data partition, wherein if the incoming data partition includes only zero data:
    logically define the incoming data partition,
    create a partition data record (PDR) for the incoming partition, and
    provide a logical address for the incoming data partition without ever allocating physical storage space in the long-term memory, wherein the PDR is utilized to return a partition comprising only zeroes when a request to read the incoming partition is received, and
  transmit an acknowledgment to a management node in response to determining that the incoming data partition includes only zero data, the acknowledgement indicating that the incoming data partition has been migrated to the mass storage system while no physical space has been allocated.

9. The apparatus according to claim 8, wherein allocating the logical storage comprises creating a partition data record comprising at least a logical address for the incoming data partition.

10. The apparatus according to claim 9, wherein creating a partition data record comprises storing the partition data record in a permanent medium.

11. The apparatus according to claim 8, wherein the processor is configured to analyze the incoming data partition, wherein if the incoming data partition includes non-zero data, the incoming data partition is stored in a permanent medium.

12. The apparatus according to claim 11, wherein if the incoming data partition includes non-zero data, the partition data record is updated to contain a physical address.

13. The apparatus according to claim 8, wherein the mass storage system comprises a thin provisioning storage system.

14. The apparatus according to claim 8, wherein the processor is configured to respond to a request to the mass storage system to provide the data partition with an outgoing data partition comprised of zero bits.

15. A computer program product claim for migrating data to a mass storage system including a cache memory and long-term storage, the computer program product comprising a non-transitory computer-readable storage medium having computer-readable program code portions stored therein, the computer-readable program code portions comprising:

a first executable portion for receiving an incoming data partition for storage in the mass storage system;

a second executable portion for allocating logical storage for the incoming data partition in the mass storage system;

a third executable portion for analyzing the incoming data partition, wherein if the incoming data partition includes only zero data:
  the incoming data partition is logically defined,
  create a partition data record (PDR) for the incoming partition, and
  provide a logical address for the incoming data partition without ever allocating physical storage space in the long-term memory, wherein the PDR is utilized to return a partition comprising only zeroes when a request to read the incoming partition is received; and a fourth executable portion for transmitting an acknowledgment to a management node in response to determining that the incoming data partition includes only zero data, the acknowledgement indicating that the incoming data partition has been migrated to the mass storage system while no physical space has been allocated.

16. The computer program product of claim 15, furthering including a fifth executable portion for, pursuant to allocating the logical storage, creating a partition data record comprising at least a logical address for the incoming data partition.

17. The computer program product of claim 16, furthering including a sixth executable portion for, pursuant to creating the partition data record, storing the partition data record in a permanent medium.

18. The computer program product of claim 15, furthering including a fifth executable portion for, pursuant to analyzing that the incoming data partition includes non-zero data, and, in response to the further determination storing the incoming data partition in a permanent medium.

19. The computer program product of claim 18, furthering including a sixth executable portion for if the incoming data partition does not include only zero data, the partition data record is updated to contain a physical address.

20. The computer program product of claim 15, furthering including a fifth executable portion for the mass storage system comprising a thin provisioning storage system.

21. The computer program product of claim 15, furthering including a fifth executable portion for responding to a request to the mass storage system to provide a data partition comprising only zero data with a data partition comprised of zero bits.

* * * * *